(12) United States Patent
Wagner et al.

(10) Patent No.: US 7,522,328 B2
(45) Date of Patent: Apr. 21, 2009

(54) THERMALLY CONTROLLED SPATIAL LIGHT MODULATOR USING PHASE MODULATION

(75) Inventors: Matthias Wagner, Cambridge, MA (US); Shuyun Wu, Acton, MA (US); Charles M. Marshall, North Andover, MA (US); Eugene Y. Ma, Newton, MA (US); John F. Heanue, Manchester, MA (US)

(73) Assignee: Redshift Systems Corporation, Burlington, MA (US)

( * ) Notice: Subject to any disclaimer, the term of this patent is extended or adjusted under 35 U.S.C. 154(b) by 146 days.

(21) Appl. No.: 11/803,044

(22) Filed: May 11, 2007

(65) Prior Publication Data

US 2008/0088906 A1      Apr. 17, 2008

Related U.S. Application Data

(60) Provisional application No. 60/851,438, filed on Oct. 13, 2006, provisional application No. 60/872,833, filed on Dec. 5, 2006.

(51) Int. Cl.
*G02B 26/00* (2006.01)
*G02B 27/00* (2006.01)

(52) U.S. Cl. ........................... 359/237; 359/578

(58) Field of Classification Search ............. 359/237, 359/240, 279, 288, 578, 580
See application file for complete search history.

(56) References Cited

U.S. PATENT DOCUMENTS 6,215,579 B1    4/2001   Bloom et al.
7,002,697 B2    2/2006   Domash et al.
7,049,004 B2    5/2006   Domash et al.
2002/0030439 A1   3/2002   Gurvitch et al.
2003/0151818 A1*  8/2003   Wagner et al. ............ 359/578
2005/0105185 A1   5/2005   Ma et al.

FOREIGN PATENT DOCUMENTS

WO        2005022900 A    3/2005

OTHER PUBLICATIONS

Osten et al.; "Spacial Light Modulators Based on Reflective Micro-Displays", Technisches Messen 73, 2006, pp. 146-156.

* cited by examiner

*Primary Examiner*—William C Choi
(74) *Attorney, Agent, or Firm*—BainwoodHuang

(57) ABSTRACT

An apparatus includes a thin-film interference filter structure having a generally wavelength-dependent resonant response to incident optical energy in a predetermined range of wavelengths. The thin-film interference filter structure includes a thermally tunable layer having a thermally tunable optical characteristic such that a range of wavelength-dependent resonant optical responses of the thermally tunable layer are induced by a corresponding range of thermal conditions of the thermally tunable layer. The thin-film interference filter structure is configured to (1) receive a spatially varying pattern of thermal energy at the thermally tunable layer to impart a corresponding spatially varying pattern to the thermally tunable characteristic of the thermally tunable layer, and (2) receive the incident optical energy into the thermally tunable layer and output optical energy having spatial modulation corresponding to the spatially varying pattern of the thermally tunable characteristic.

34 Claims, 9 Drawing Sheets

THERMALLY CONTROLLED SPATIAL LIGHT MODULATOR USING PHASE MODULATION

CROSS REFERENCE TO RELATED APPLICATIONS

This Patent Application claims the benefit under 35 U.S.C. § 119(e) of U.S. Provisional Application 60/851,438 filed Oct. 13, 2006 and 60/872,833 filed Dec. 5, 2006, the contents and teachings of which are hereby incorporated by reference in their entirety.

BACKGROUND

The present invention is related to the field of solid-state light beam tunable devices, referred to herein as light modulators.

U.S. Pat. No. 7,002,697 B2 discloses an optical instrument which includes a thermo-optically tunable, thin film, free-space interference filter having a tunable passband which functions as a wavelength selector. The filter includes a sequence of alternating layers of amorphous silicon and a dielectric material deposited one on top of the other and forming a Fabry-Perot cavity structure having: a first multi-layer thin film interference structure forming a first mirror; a thin-film spacer layer of amorphous silicon deposited on top of the first multi-layer interference structure; and a second multi-layer thin film interference structure deposited on top of the thin-film spacer layer and forming a second mirror. The filter further includes a lens for coupling an optical beam into the filter; an optical detector for receiving the optical beam after the optical beam has interacted with the interference filter; and circuitry for heating the thermo-optically tunable interference filter to control a location of the passband.

U.S. Pat. No. 7,049,004 B2 discloses a dynamically tunable thin film interference coating including one or more layers with thermo-optically tunable refractive index. Tunable layers within thin film interference coatings enable a new family of thin film active devices for the filtering, control, and modulation of light. Active thin film structures can be used directly or integrated into a variety of photonic subsystems to make tunable lasers, tunable add-drop filters for fiber optic telecommunications, tunable polarizers, tunable dispersion compensation filters, and many other devices.

SUMMARY

In accordance with the present invention, an apparatus is disclosed that includes a thin-film interference filter structure having a generally wavelength-dependent resonant response to incident optical energy in a predetermined range of wavelengths. The thin-film interference filter structure includes at least one thermally tunable layer having a thermally tunable optical characteristic such that a range of wavelength-dependent resonant optical responses of the thermally tunable layer are induced by a corresponding range of thermal conditions of the thermally tunable layer. The thin-film interference filter structure is configured to (1) receive a spatially varying pattern of thermal energy at the thermally tunable layer to impart a corresponding spatially varying pattern to the thermally tunable characteristic of the thermally tunable layer, and (2) receive incident optical energy into the thermally tunable layer and output optical energy having spatial modulation corresponding to the spatially varying pattern of the thermally tunable characteristic.

The apparatus can be used in a variety of applications including infrared imaging and as part of a display such as a visual display. In another class of embodiments the apparatus can be used in optical communications systems for example as part of an add-drop multiplexer or other device performing wavelength-selective processing.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1:
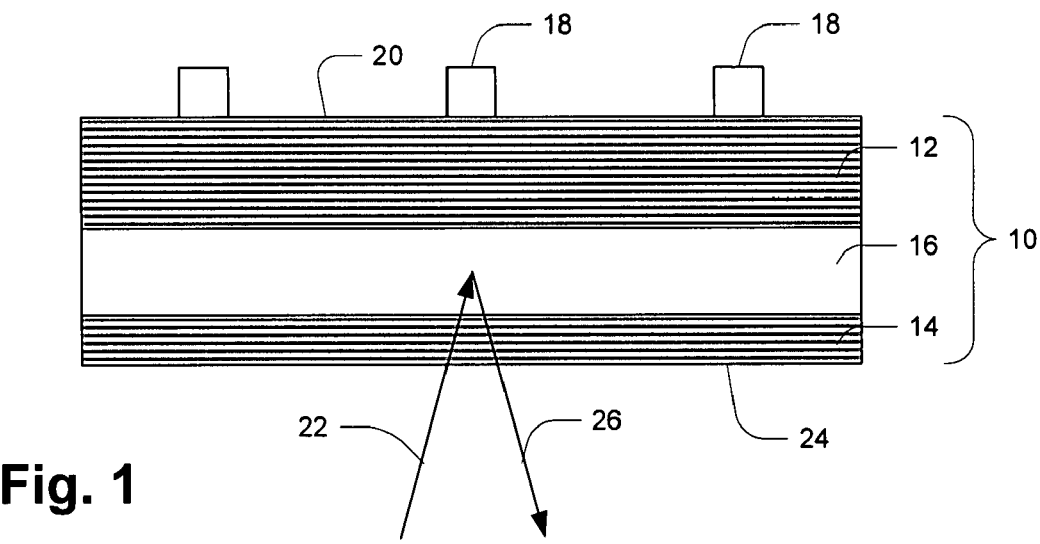
FIG. 1 is a schematic side view of a thin-film, thermally controlled spatial light modulator according to an embodiment of the invention.

FIG. 1 shows a thin-film, thermally controlled spatial light modulator (SLM). The SLM includes an optical resonant structure 10 formed of a first mirror 12 (also called a "back mirror" below), a second mirror 14 (also called a "front mirror" below), and an optical layer 16. The SLM also includes spatially distributed thermal elements 18 at an upper surface 20 that operate to couple thermal energy to/from respective areas of the optical resonant structure 10. The optical layer 16 is made of a material (or combination of materials) so as to have a thermally tunable optical property such that thermal variations across the SLM result in corresponding variations in the optical resonant characteristics of the SLM. In the illustrated embodiment, the first mirror 12 is substantially fully reflective, and the second mirror 14 partially reflective, at a predetermined wavelength of the optical beam 22 (which may be monochromatic or polychromatic as described in more detail below). For example, the first mirror 12 may have a reflectivity above 99%, and the second mirror 14 a reflectivity of about 50%. The reflectivity of the second mirror 14 may vary dramatically (from 10% to 90%, e.g.) depending on the application. Optionally, an additional layer of highly reflective material may be added to further improve the reflectivity of the first mirror 12, such as described below with reference to FIG. 18.

In operation, the SLM of FIG. 1 receives a spatial distribution of thermal energy at the thermal elements 18, and receives an incident optical beam 22 at a lower surface 24. The terms "upper" and "lower" are used for ease of reference only, and are not intended to imply any particular spatial orientation or configuration of the SLM. The resonant optical structure 10 imparts a spatial distribution of phase modulation on the optical energy of the incident optical beam 22, to generate an outgoing optical beam 26 having a desired characteristic caused by the phase modulation. The desired characteristic may be a spatial distribution of phase variation corresponding to a thermal image received via the thermal elements 18, for example, or it may be one of other types of characteristics as needed in a particular application of the SLM. Specific examples are given below. It should be noted that while the SLM of FIG. 1 is configured to operate in reflection (outgoing beam 26 propagates opposite to the direction of propagation of incident beam 22), alternative embodiments may be configured to operate in transmission.

In general, it is desired that the material(s) of the optical layer 16 exhibit a thermo-optic coefficient (the normalized derivative of the real part of the refractive index n as a function of temperature T) greater than about $10^{-5}$ per degree Kelvin, that is:

$$|(1/n)(dn/dT)| > 10^{-5}/K$$

Such materials, for example amorphous silicon, provide relatively high gain in the process of converting thermally expressed information (received via the thermal elements 18) into a useful pattern of optical phase modulation.

It is noted that the thermal elements 18 are generalized representations of differently types of thermally active structure that may be present in alternative embodiments. In one type of embodiment described below, the thermal elements 18 take the form of radiation absorbers. In another type of embodiment also described below, they take the form of electrically controlled resistive elements. Other variations are also referred to below.

Figure 2:
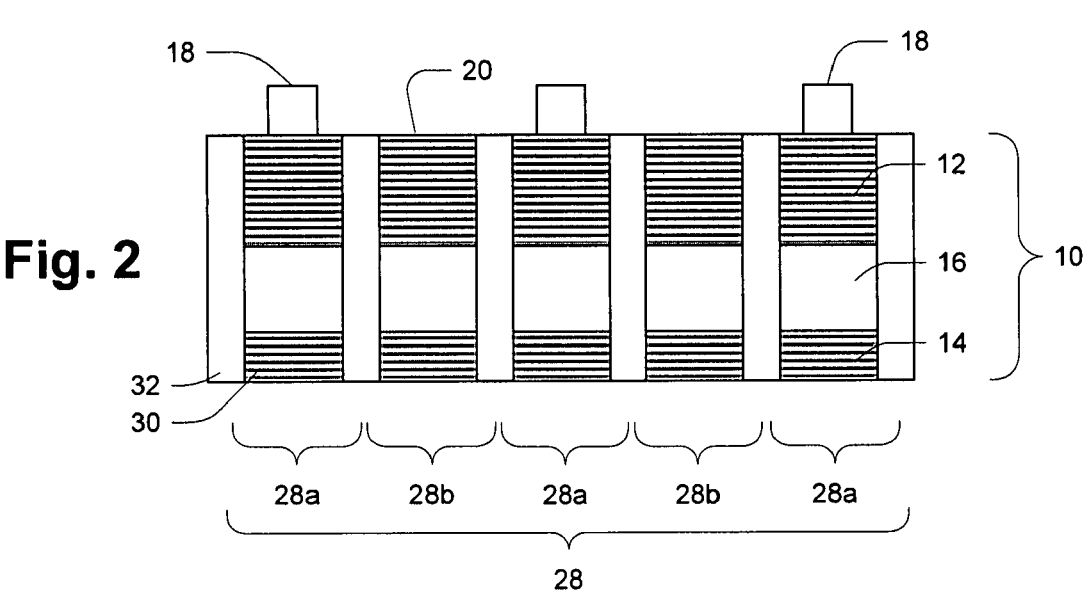
FIGS. 2-9 are schematic side views of thin-film, thermally controlled spatial light modulators according to various embodiments of the invention.

FIG. 2 shows a variant of the general SLM of FIG. 1 in which individual sections 28 are formed that are relatively thermally isolated from each other to create thermal isolation areas. Each section includes a respective active area 30 separated from the active area 30 of neighboring sections 28 by one or more isolation areas 32. Such sectioning can be accomplished in a variety of ways, including for example performing a patterned etch of a thin-film structure such as that of FIG. 1. By improving the thermal isolation among different areas of the SLM, sectioning can significantly enhance spatial resolution and contrast. Note that the thermal isolation provided by isolation areas 32 may vary by application and that varying degrees of isolation may be provided by different methods of creating isolation areas 32. The spatial frequency of the isolation areas 32 across the SLM may also be adjusted in order to change the contribution of the isolation areas to the outgoing optical beam 26. In one embodiment, the spatial frequency of the isolation region 32 may be twice the spatial frequency of the thermal elements 18, thereby generating a signal in a diffractive system that it is at a higher order than and separable from the principal signal from the thermal elements 18.

It should be noted that in the embodiment of FIG. 2 the sections 28 may be divided into interspersed "signal" sections 28a and "reference" sections 28b, with the signal sections 28a including thermal elements 18 and the reference sections 28b lacking them. This arrangement can be utilized to provide a self-referencing or differential aspect of operation, in which the signal sections 28a receive thermal signals of interest (via the thermal elements 18). Both the signal sections 28a the reference sections 28b experience a background or reference thermal level. The sections 28a and 28b generate differential and common-mode components of the outgoing optical beam 26, and using appropriate techniques these components can be separated and then combined in a manner tending to cancel the common-mode reference or background level, resulting in a higher signal-to-noise ratio than present in the signal component alone. Self-referencing can thus be a powerful and useful technique in a variety of applications. Nonetheless, in some embodiments self-referencing may not be required, and in such cases it may be desirable to include thermal elements 18 in all, or substantially all, of the sections 28 to maximize the coupling of thermal information to the SLM. It should also be noted that the ratio of the number of signal sections 28a and reference sections 28b may be application dependent and that the number of reference sections 28b may be equal to, more than, or less than the number of signal sections 28a.

Figure 3:
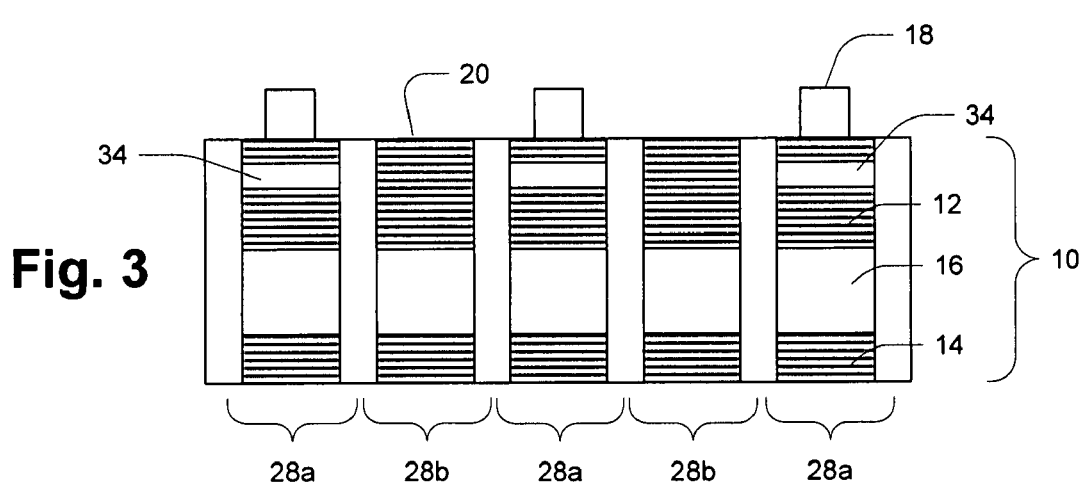
Figure 4:
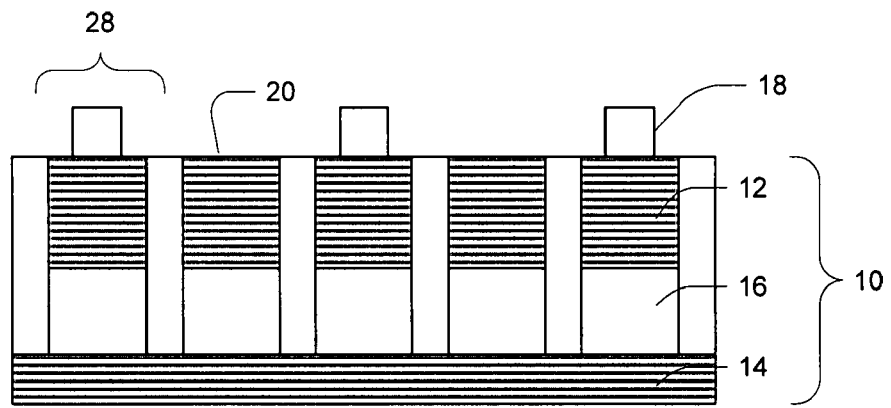

FIG. 3 shows another variant which employs a bias element 34 in each of the signal sections 28a. As explained below, there is a diffraction efficiency "response curve" that describes the operational behavior of the resonant optical structure 10 in combination with signal section 28a and reference section 28b. The response curve has a generally periodic shape, and therefore has relatively steeper portions of greater relative response. The bias element 34, for example, may be used to cause operation to occur closer to this steeper portion of the response curve in the absence of a signal from thermal elements 18. Not only does this improve signal response, but it also enables detection with the correct polarity of thermal input that is colder than the reference or background level sensed by the reference sections 28b. The bias elements 34 can be formed in a variety of ways, including for example by adding an optically transparent thin film layer to signal section 28a that does not exist in reference section 28b (or conversely, adding a thin film layer to reference section 28b that does not exist in reference section 28a). Equivalently in some configurations of optical resonant structure 10, the offset can be formed by subtracting an optically transparent thin film layer to signal section 28a that exists in reference section 28b). It will be appreciated that in alternative embodiments such biasing can be accomplished by other means, including for example relative mechanical displacement between the sections 28a and 28b. An advantage of incorporating the optical offset rather than mechanical offset into the optical resonant structure 10 is that the offset is effective only at wavelengths within the resonant bandwidth. In addition, such biases may be introduced into structures that do not have distinct signal and reference sections, and furthermore may be introduced with more than two levels, for instance an entire series of steps may be used to build a "blazed" grating structure. Additional details are provided below FIG. 4 illustrates an alternative way of forming the sections 28 in which the second mirror 14 is unbroken across some or all of the sections 28. This continuous mirror may form a mechanical support and possibly a thermal ground plane where the structure is free-standing, and also functions to minimize the portion of the incoming optical energy is diffracted by the isolating structures.

Figure 5:
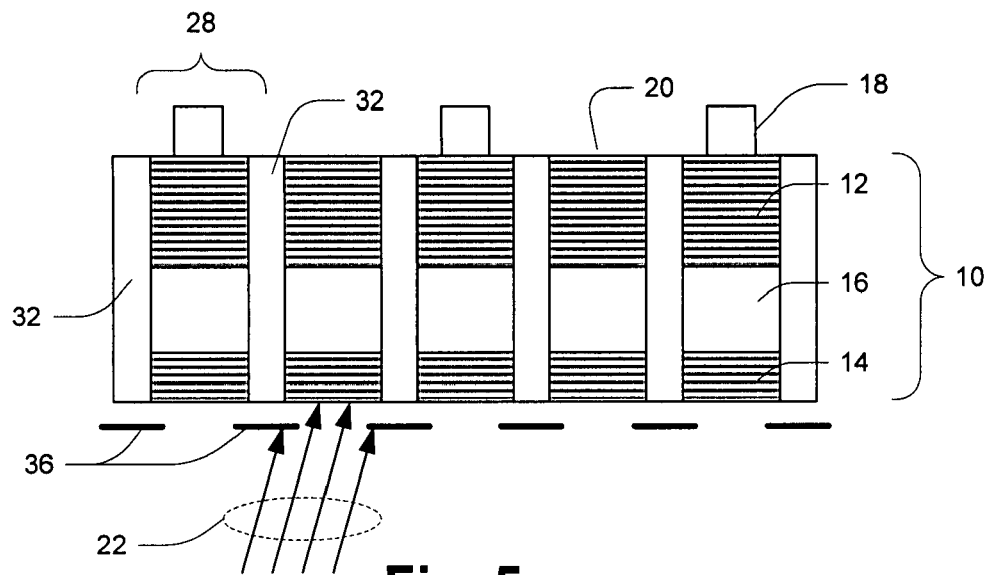

FIG. 5 illustrates an alternative that employs a mask 36 to reduce the coupling of optical energy from the incident optical beam 22 into the isolation areas 32 between the sections 28, thereby reducing the contribution of any such coupling to the outgoing optical beam 26. Rather than having the incident optical beam 22 be incident on the isolation areas 32, the incident optical beam 22 is incident on the mask 36. Any such energy coupled into the output optical beam 26 in manner that is not separable from the contribution due to the thermally tunable optical layer is effectively a source of noise and is preferably kept as low as possible. The mask 36 is made of a material that is relatively opaque (absorptive or reflective) at the wavelength(s) of the incident optical beam 22. The separation of the mask 36 from the resonant optical structure 10 may optionally be set to provide an integer number of wavelengths of phase difference light in output optical beam 26 relative to the incident optical beam 22.

Figure 6:
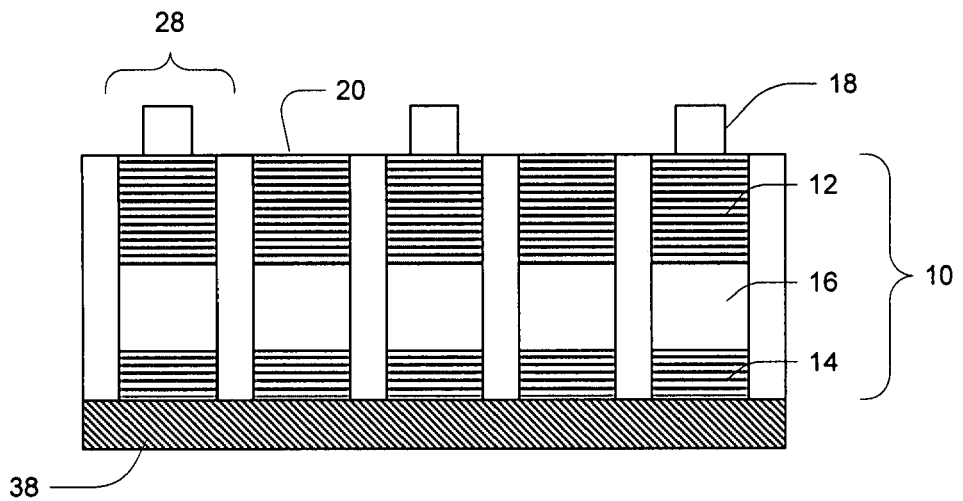

FIG. 6 shows an alternative in which the sections 28 are all in contact with a common thermal "ground" 38, which may be a thin-film layer of a thermally conductive material or some other thermally conductive structure. In an alternative embodiment the common thermal ground 38 may be actively thermally controlled to control the resonant wavelength. In another embodiment the common thermal ground 38 is actively monitored with a temperature sensor, and the resulting temperature information is used to control characteristics of the incident optical beam 22, such as its wavelength distribution.

Figure 7:
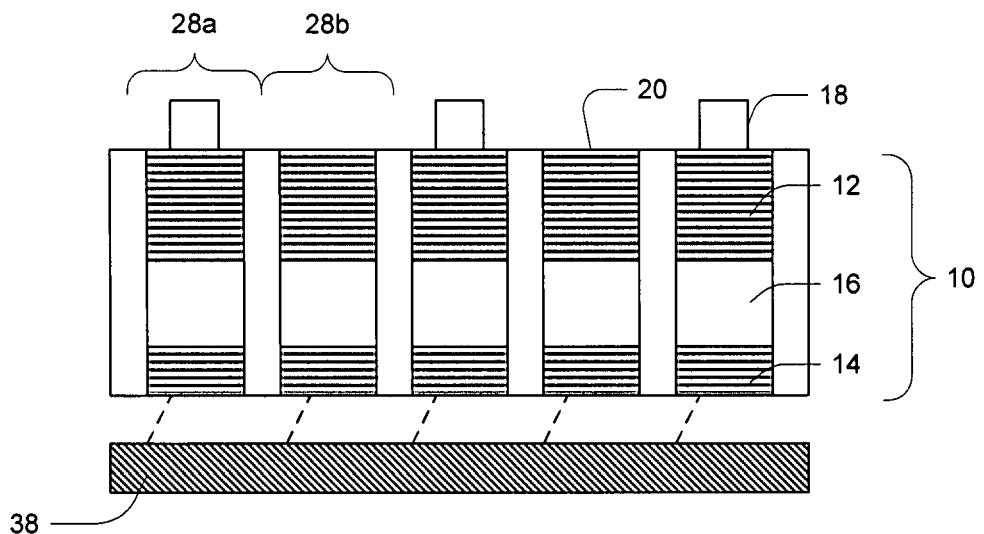

FIG. 7 shows an alternative in which the sections 28 are all thermally isolated from a common thermal ground 38 if present. This arrangement may provide greater overall sensitivity of the SLM. This kind of configuration may be preferable for some applications. Alternatively, signal sections 28a may be thermally isolated from the thermal ground and reference sections 28b may be in contact with the thermal ground. Alternatively, in another embodiment, a second set of thermal elements can be added to the lower surface 24, thereby enabling a thermal signals to be coupled into sections 28 at surface 24 either as common mode signals or differential signals. For example, each reference 28b may have a thermal or temperature bias relative to each signal section 28a. Alternatively, different thermal signals can be introduced at lower surface 24 in the same manner as described in FIG. 1 for the upper surface 20 and thermal elements 18 of FIGS. 1-6. In this manner the thermal variations at the optical layer will be due to the combined signal from the upper and lower thermal elements. As for operation in transmissive mode as discussed for FIG. 1, thermal elements on the lower surface are constructed in such a manner as to allow propagation of incident lower beam 22 and outgoing optical beam 26 as, for example by the use of transparent materials in the thermal elements.

Figure 8:
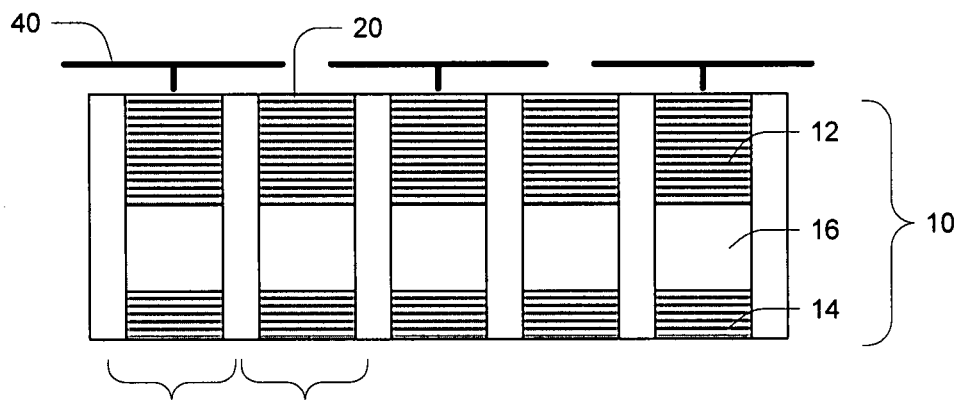

FIG. 8 shows an alternative in which the signal sections 28a include radiation absorbers 40 conductively coupled to the thermal elements 18. This configuration may be useful in applications in which energy is provided to the SLM in a radiated form, such as for example in infrared (IR) imaging applications. The radiation absorbers 40 are made of a material or structure that is absorptive at the wavelengths of interest (e.g., in the long-wave infrared (LWIR) range). As shown, the radiation absorbers 40 can extend laterally to at least partially cover adjacent reference areas 28b, thus both increasing signal strength and reducing the amount of thermal signal incident on the reference areas 28b, thereby increasing the differential response. Radiation absorbers 40 may be positioned a quarter wavelength of the radiation above the highly reflective layer 20 in order to increase the absorption efficiency of the radiation absorbers 20.

Figure 9:
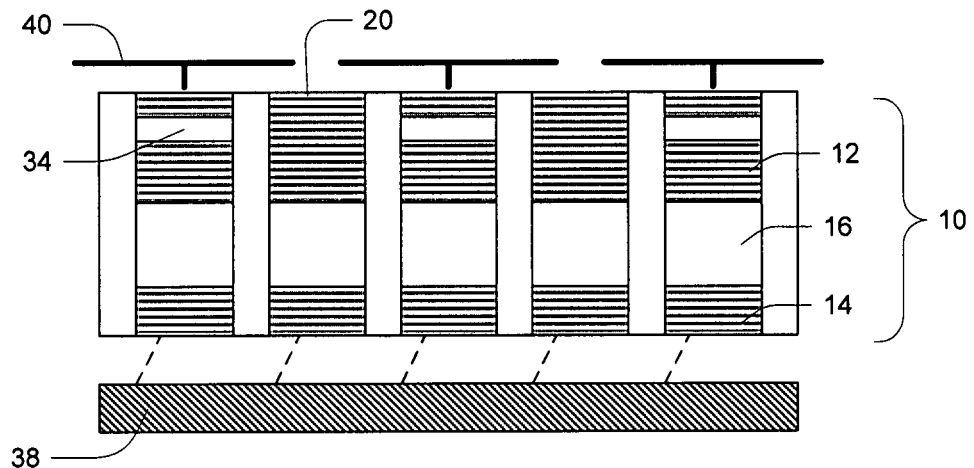

FIG. 9 shows a configuration in which the radiation absorbers 40 are utilized as well as the bias elements 34, and the sections 28 are thermally isolated from any common thermal ground 38. This specific configuration may be particularly well suited to LWIR imaging applications for example. Those skilled in the art will appreciate that alternative embodiments may employ other combinations of the features appearing in the alternative embodiments shown in FIGS. 1-8.

Figure 10:
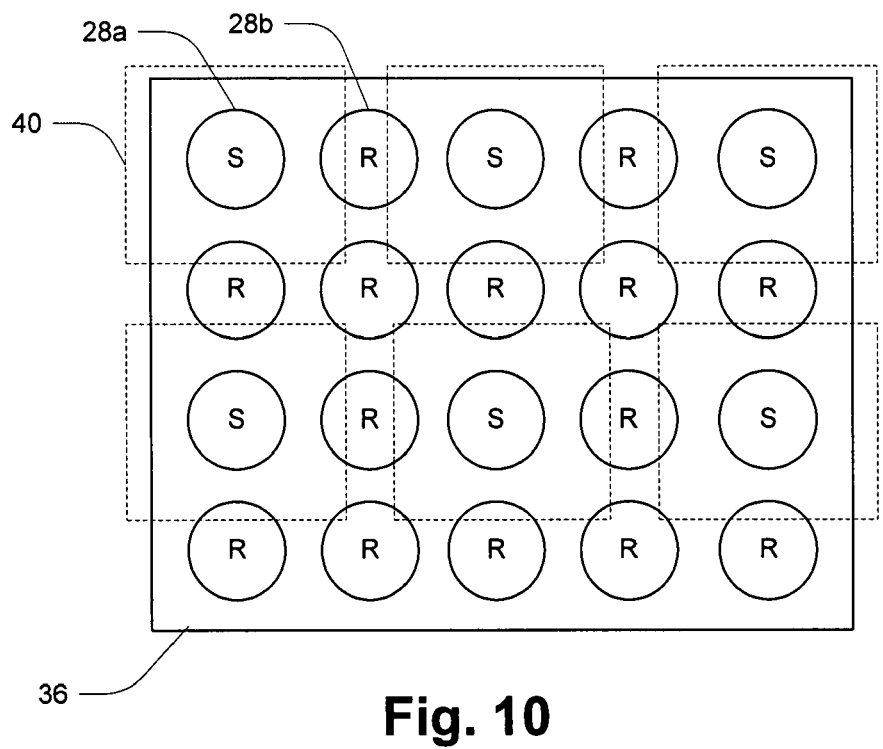
FIG. 10 is a schematic plan view of a thin-film, thermally controlled spatial light modulators according to an embodiment of the invention.

FIG. 10 is a plan schematic view illustrating how signal sections 28a (indicated with the letter "S") and reference sections 28b (indicated with the letter "R") might be laid out in one embodiment. In the specific illustrated configuration, each signal section 28a is surrounded by eight reference sections 28b. The optional thermal absorbers 40 are shown in dotted outline. These would be arranged above the structure 10 as shown in FIG. 8. Also shown is the mask layer 36 which would be arranged underneath the sections 28 as shown in FIG. 5 (note that the perforations of the mask 36 are not shown as they would be occluded by the sections 28 in the view of FIG. 10).

Figure 11:
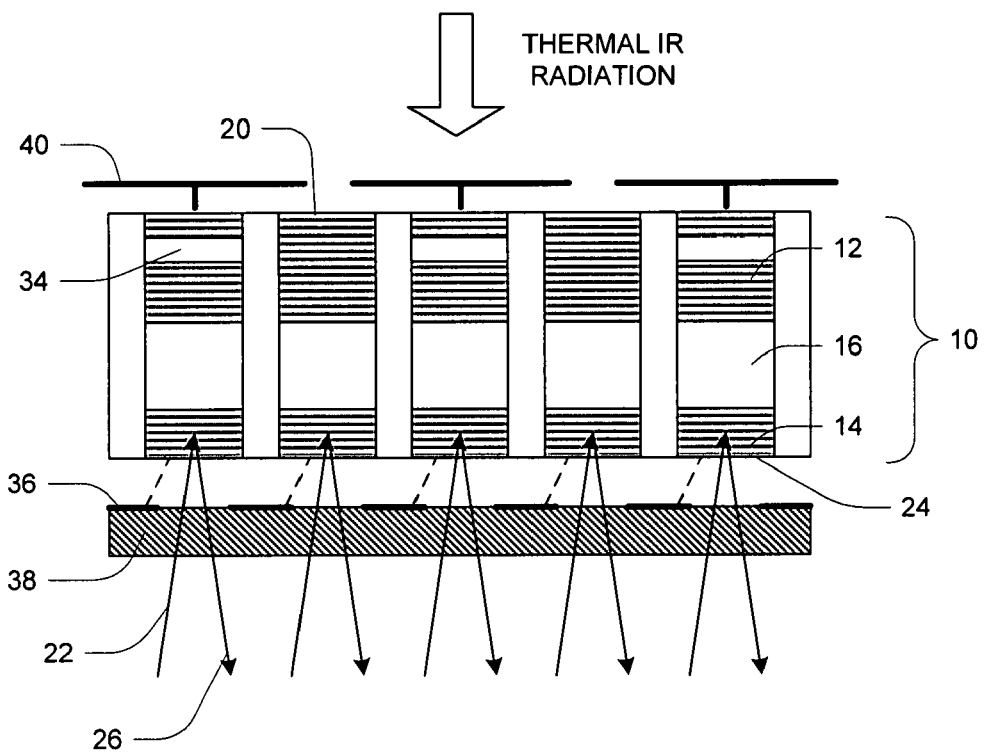
FIG. 11 is a schematic side view of a thin-film, thermally controlled spatial light modulator according to an embodiment of the invention.
Figure 12:
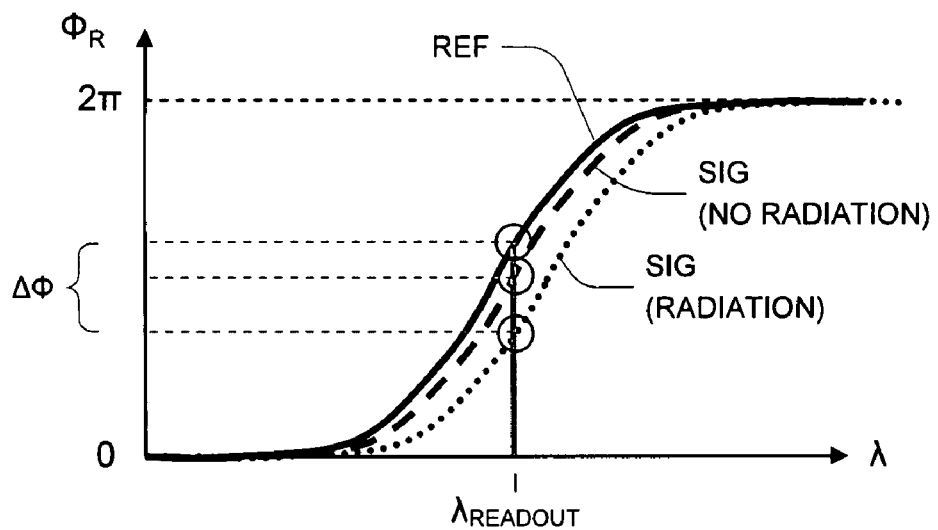
FIG. 12 is a plot showing phase response as a function of wavelength for the spatial light modulator of FIG. 11.

FIGS. 11 and 12 illustrate the operation of the SLM of FIG. 9, including the mask 36 of FIG. 5. FIG. 11 shows the SLM receiving incident thermal IR radiation at radiation absorbers 40, and an incident optical readout beam 22 and outgoing optical beam 26 at its lower surface 24. FIG. 12 shows the optical response characteristic (REF) of a reference section 28b as well as the response characteristic (SIG) of a signal section 28a both in the absence and presence of incident IR radiation (NO RADIATION and RADIATION respectively). In particular, the optical characteristic is the phase $\Phi_R$ of the portion of the (reflected) outgoing optical beam 26 from the respective section 28. As shown, this value transitions from 0 to $2\pi$ in the region of a readout wavelength $\lambda_{READOUT}$. The value $\Delta\Phi$ in FIG. 12 is a generalized indication of the order of the difference between the phase imparted by the reference sections 28b and the phase imparted by the signal sections 28a when thermal radiation is incident thereon.

Figure 13:
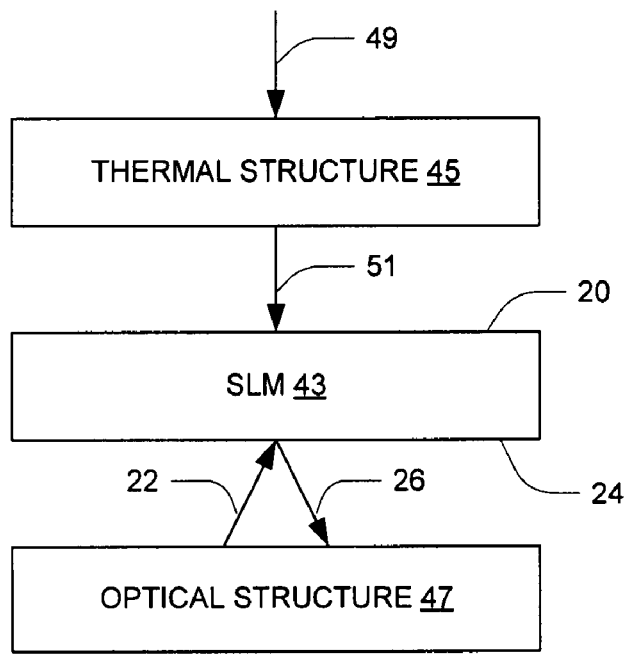
FIG. 13 is a general block diagram depicting the use of the spatial light modulator in a system or application.

FIG. 13 shows a generalized block diagram of a system or application for an SLM. The SLM is shown with reference numeral 43. A thermal structure 45 is arranged opposite the upper surface xx, and an optical structure 47 is arranged opposite the lower surface 24. Thermal structure 45 responds to a received signal 49 to provide a spatially varying pattern of thermal energy 51 to the upper surface 20 of the SLM 43. In the embodiments of FIGS. 1-11, the thermal elements 18 are included within the SLM 43. The optical structure 47 generates the incident optical beam 22 and receives the outgoing optical beam 26.

In one embodiment, the system is an infrared (IR) imaging system or similar measurement/sensor system. In such an application, the received signal 49 may be source IR radiation from a scene of interest, for example, and the thermal structure 45 may comprise an IR lens and/or other thermal optical devices to focus the source IR radiation onto the SLM 43. The incident optical beam 22 is an optical readout beam which may be generated by a laser or similar source (not shown) in the optical structure 47. The outgoing beam 26 is a beam having a spatially varying modulation pattern representing the IR image, and it is utilized by components in the optical structure 47 to provide information to a user about the spatial distribution of the thermal energy in the received signal 49 (such as by converting the outgoing beam 26 into an electronic signal via a suitable transducer). The optical structure 47 may include Fourier optics, spatial filters and other optical components to condition the outgoing beam 26, as described in greater detail below. In an alternative embodiment, the thermal structure 45 may be configured to receive the source thermal energy in the form of conducted rather than radiated thermal energy, for example in an application for detecting a pattern of thermal energy from a chemical or biological assay. Other embodiments are described below.

Figure 14:
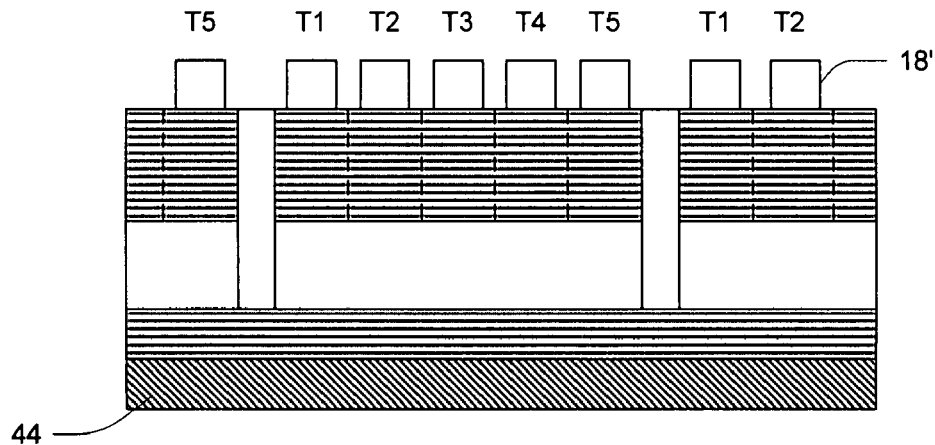
FIG. 14 is a schematic side view of a thin-film, thermally controlled spatial light modulator according to another embodiment of the invention.

FIG. 14 shows an SLM which may be useful in an alternative application of separating one or more wavelength components from a multi-wavelength optical signal, such as in wavelength-division multiplexed (WDM) optical communications systems for example. In this embodiment, the thermal elements 18' are active heating elements (such as resistors) that can be controlled by external circuitry (not shown) to control the spatial thermal distribution of the SLM in a manner that results in separating out the desired wavelength(s). The thermal elements 18' are arranged into sets labeled T1, T2, ..., T5 corresponding to distinct predetermined localized temperatures. Also present is a common heater element 44. In operation, the common heater element 44 is utilized to tune the SLM to a particular wavelength $\lambda_i$, by establishing a temperature denoted T0, and the elements 18' are set to temperatures that cause the SLM to diffract the wavelength $\lambda_i$ at a different angle than the other wavelengths present in the incident optical beam 22. Once this spatial separation has been created, the separate components can be processed as desired by other system components. In a WDM system, the SLM can form part of an optical add/drop multiplexer (OADM) which selectively removes one or more wavelength components of interest from a received WDM signal and selectively adds one or more wavelength components of interest to an outgoing WDM signal.

Figure 15:
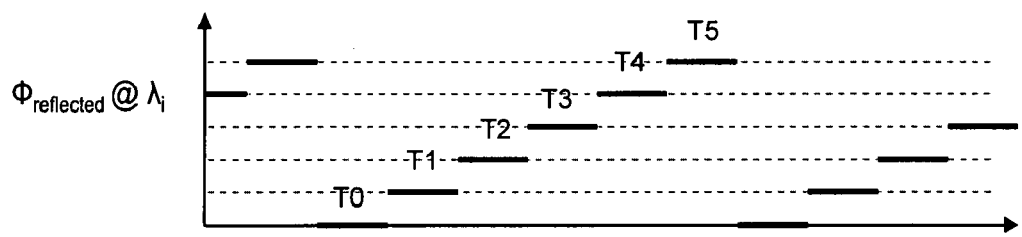
FIG. 15 is a plot showing the temperature control signals for the spatial light modulator of FIG. 14.
Figure 16:
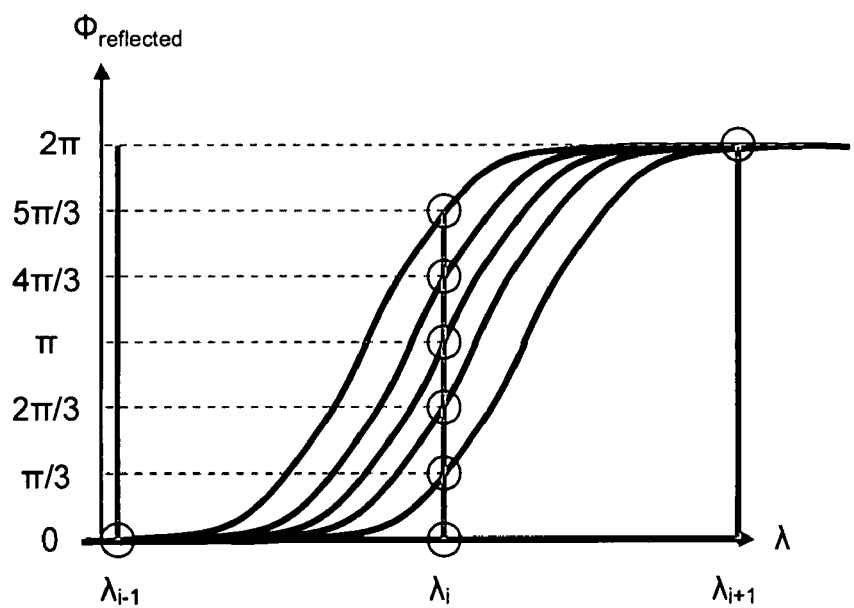
FIG. 16 is a plot showing phase response as a function of wavelength for the spatial light modulator of FIG. 14.
Figure 17:
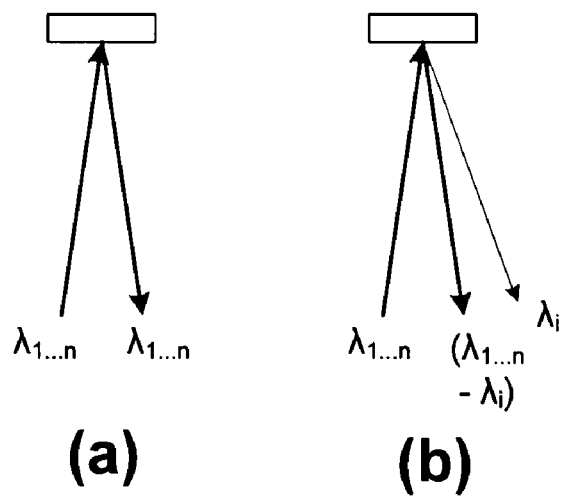
FIG. 17 illustrates the operation of the spatial light modulator of FIG. 14.

FIG. 15 illustrates the set of temperatures T0-T5 that can be utilized. These are a set of "stepped" or temperatures designed to introduce uniformly offset phase differences as shown, which induce corresponding localized amounts of phase shift to the reflected wavelength component $\lambda_i$. The reflected phase characteristics are further illustrated in FIG. 16, which shows how the phase-versus-wavelength optical characteristic is exploited to yield the set of phase shifts n$\pi$/3) for n=0, 1, 2, 3, 4, 5 (each corresponding to a different temperature T0-T5). The overall behavior of the SLM is that of a wavelength-selective blazed grating, as illustrated in FIG. 17. FIG. 17(a) shows operation in which all the temperatures T0-T5 are equal to each other, and FIG. 17(b) shows operation in which T0-T5 have the stepped values shown in FIG. 15. As shown in FIG. 17(b), the wavelength component $\lambda_i$ has a larger diffraction angle than the other components (shown as $\lambda_1 \ldots _n$-$\lambda_i$) Optical device(s) can be placed at a suitable location along the trajectory of the wavelength component $\lambda_i$ to perform one or more desired functions that are specific to that wavelength component.

As indicated above, the SLM described above with reference to FIGS. 14-17 may be used as part of an optical device in an optical communications system. Referring again to FIG. 13, in such an application the SLM is shown at reference numeral 43. The optical structure 47 is configured to provide a first optical communications signal to the SLM 43 as the incident optical beam 22, and to utilize the outgoing optical beam 26 from the SLM 43 as a second optical communications signal. For example, the incident optical beam 22 might be a WDM signal received from another communications node, and the outgoing optical beam 26 might be a modified WDM signal for transmission to another communications node. The modification might be in the form of locally dropping one or more wavelengths as described above. It should be noted that the same structure can also be used to add one or more wavelengths, by simply reversing the directions of all the beams shown in FIG. 17.

In such an application, the received signal 49 (FIG. 13) is an electrical control signal generated within the optical communications device, for example by separate control circuitry not shown, which is generated for particular wavelength(s) to be added/dropped (or other optical function to be performed). The thermal structure 45 is configured to generate, in response to the received signal 49, the spatially varying pattern of electronic signals of thermal energy 51 provided to the SLM 43. The spatially varying pattern of thermal energy 51 is a predetermined pattern effective to enable the SLM 43 to perform the desired optical function. For example, the spatially varying pattern of thermal energy 51 may be the pattern of temperatures T0-T5 as discussed above, generated for example via the thermal elements 18'.

Figure 18:
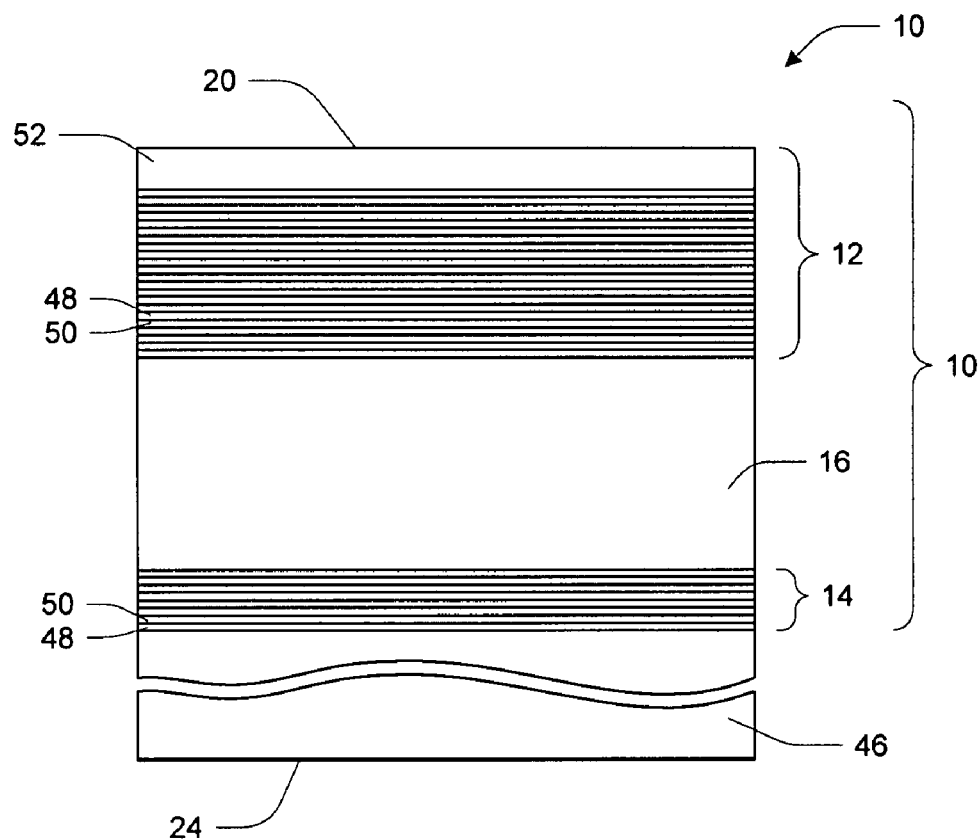
FIG. 18 is a schematic side view showing the layered structure of the spatial light modulator in greater detail.

FIG. 18 shows the thin-film structure of an SLM in greater detail. It can be fabricated using standard optical coating technologies and available coating materials, such as silicon (Si), silicon nitride ($SiN_x$), platinum (Pt), etc. The structure includes a substrate 46 at the lower or "readout" surface 24. The substrate material is transmissive at the designed readout wavelength, e.g. visible or near IR. Typically a glass substrate is used, although other optical materials (e.g., sapphire, quartz, etc.) are suitable alternatives. Preferably the substrate is anti-reflection (AR) coated on its exposed faces. In one embodiment, the substrate thickness may be generally about 650 um. In another embodiment, the structure 10 may comprise a Gires-Tournois etalon.

The optical structure 10 is deposited on the substrate 46. As described above, the structure 10 generally comprises three sections: a low reflectivity (for instance 50%) front mirror 14, an optical layer 16, and a high reflectivity (ideally 100%) back mirror 12. The front mirror 14 is preferably a multilayer dielectric stack, designed using well established principles of the optical coating art. For example, for a nominal readout wavelength of 0.85 microns, a four layer stack comprising alternating quarter-wave layers 48 and 50 of amorphous Si and $SiN_x$ respectively may be used, starting with the high index Si layer 48, to form a suitable front mirror 14. In this embodiment, the Si layer 48 may be nominally 55.6 nm in thickness, and the $SiN_x$ layer nominally 109.9 nm in thickness.

The optical layer 16 nominally has an optical thickness which is an integral number of half wavelengths. An optical thickness of two wavelengths may be desirable. Typically the optical layer 16 is of the same material used in the multi-layer mirrors 12 and 14. Thus in one embodiment the cavity layer may be of amorphous Si and have a thickness of nominally 444.8 nm.

The back mirror 12 is also preferably a multilayer dielectric stack. For a nominal readout wavelength of 0.85 microns, an eight layer stack comprising alternating quarter-wave layers may form a suitable back mirror 12. Note that both the front and back mirror stacks 14, 12 have a low-index layer disposed next to the high-index Si optical layer 16. The back mirror 12 also includes a final metallic layer 52, in one embodiment a thin layer of platinum, to further enhance reflectivity. This final layer ensures that the desired nearly 100% reflectivity is achieved. An input interface structure is disposed in thermal contact with the back side of the optical structure 10. In one embodiment, the total thickness of the optical structure 10, not including the substrate 46, is on the order of 1.7 microns.

It will be recognized by those of skill in the optical art that other materials and designs could be used to effect the same or similar results, particular when a different readout wavelength is desired.

Figure 19:
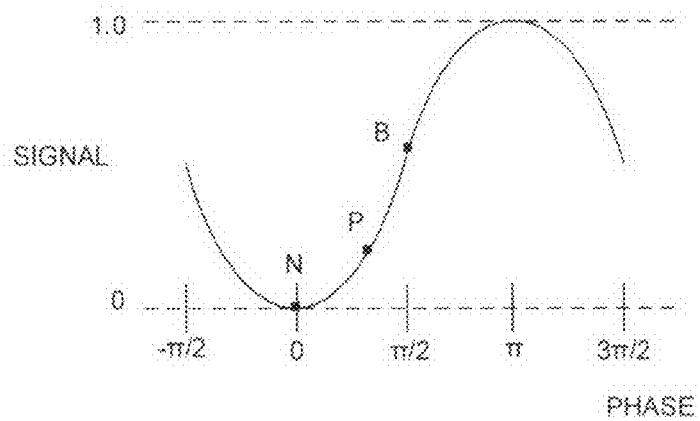
FIG. 19 is a plot showing the signal response as a function of phase as motivation for utilizing a non-zero bias in a spatial light modulator.

FIG. 19 is used to explain the rationale for introducing a fixed phase bias into the response of the SLM, as mentioned above with reference to FIG. 3. FIG. 19 illustrates that the diffraction efficiency of a phase grating—that is, the amount of optical energy diffracted into the higher (non-zero) orders (shown as "signal")—is a non-linear, periodic, symmetric function of the peak-to-valley phase difference (shown as "phase"). In one class of embodiments the energy diffracted into the non-zero orders is the signal of interest in the system. A single first order or any combination of first orders and higher orders may be used. The phase depth of this type of grating is proportional to the difference in temperature between alternating sections 28 (signal and reference), so the normal operating point, i.e., the operating point when there is no input, for an SLM phase grating is at the zero temperature difference point, indicated by "N" in FIG. 19. One benefit of operating at this point "N" is that there is zero output intensity when there is zero signal. However, there can also be drawbacks. Due to the inflection, temperatures that are offset from N in either direction (relatively higher or lower) result in the same output, i.e., there can be ambiguity whether a particular output means a net positive or net negative temperature difference from the background temperature.

Thus, it may be convenient to bias alternate sections 28 of the SLM to operate on the steeper and more linear portion of the diffraction efficiency response curve, such as indicated by point "B" in FIG. 19. This can be done by adding a net phase bias to alternate pixels such as described above with reference to FIG. 3. Operating at such a bias point not only improves the small signal system response and gives a more linear input-output relationship, but also allows for thermal input signals less hot than the background (that is, a "negative" phase depth) to be resolved without ambiguity. The maximum phase bias is preferably less than $\pi$ radians in some applications, at which point the response curve is again low slope, non-linear, and symmetric with regard to negative temperatures.

In many applications the preferred phase bias is less than $\pi/2$ radians. For example, in temperature sensing applications, the total induced signal phase is a small fraction of a cycle. The preferred bias, then, is one that is large enough to move the small signal response away from the flat portion of the response/diffraction efficiency curve (i.e., away from point "N") but not so large as to introduce a large background intensity bias. This point is indicated notionally in FIG. 19 as point "P". Alternatively, if high zero order reflection is desired, than point N may be preferred, albeit with lower contrast Although as indicated above the phase bias can be accomplished optically such as through use of bias elements 34, in alternative embodiments a mechanical phase biasing technique may be used, such as by mechanically displacing alternating sections 28. Such mechanical displacement may be created by pre-patterning a sacrificial layer on the substrate prior to depositing the optical structure 10. The sacrificial layer creates a series of islands which define the mechanical displacement for alternating sections 28. Suspension features can be formed to hold the alternate sections 28 (e.g., signal sections 28a) which initially rest on the islands above the substrate. Reference sections 28a may also be suspended from suspension arms such that alternating signal and reference sections may be achieved as shown in FIG. 10.

Subsequently the sacrificial layer islands are etched away, leaving alternating sections 28 suspended by the suspension features.

The response sensitivity and time constant of the SLM are determined by the balance between the rate of thermal energy transferred into an area of the optical structure 10 from the input interface, the thermal capacity of the elements 18, and the rate of heat transfer out of the area to any nearby heat sink/substrate or other dissipation mechanisms. In any particular embodiment it will generally be desirable to achieve a desired balance based on the requirements of the application.

Figure 20:
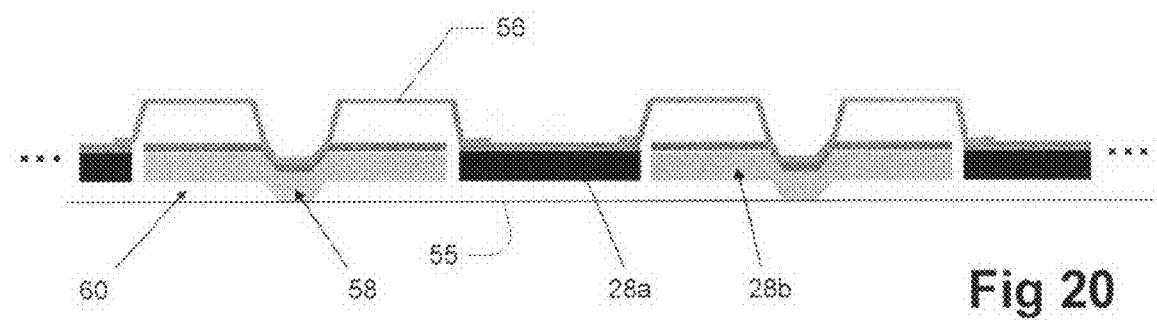
FIG. 20 is a side view of a spatial light modulator illustrating certain mechanical features usable in an embodiment of the invention.

FIG. 20 illustrates in side view one embodiment, in a self-compensated configuration, in which signal sections 28a have a limited conductivity path to the heat sink and the reference sections 28b have a high conductivity path to the heat sink. In general, it may be desirable to reduce the rate of transfer out of the signal sections 28a; that is, it is typically desirable to isolate the signal pixels from a heat-sinking substrate 55. As illustrated in FIG. 20, each signal section 28a is suspended away from the substrate 55 by suspension features such as thin suspension arms 56, attached to the top surface of the surrounding reference section(s) 28b. The reference sections 28b may in turn be in direct contact with the substrate 55 through one or more "bumps" 58 for example.

The suspension arms 56 may be fabricated using silicon oxide, silicon nitride, cured polymer or other structural thin film material. If an absorber 40 is used (FIG. 9), it is preferably made of the same material as the suspensions arms 56. It is advantageous that the suspension arms 56 have low thermal conductivity, such as by the use of low conductivity material and patterning of the suspension arms 56 to achieve the desired thermal isolation between signal sections 28a and the substrate 55. An additional material, such as a thin metal for example, may be added to certain regions of the absorber 40 to enhance absorption of the input signal. This thin metal is not typically added to the suspension arms 56 as it undesirably increases thermal conductivity. The absorber 40 and suspension arms 56 may be constructed separately such that the absorber is an "umbrella" above each of the suspension arms 56, the signal sections 28a and the reference sections 28b while being attached to the sensor section 28a to provide both structural support and a thermal pathway. When the absorber 40 and suspension arms 56 are constructed separately, different materials maybe used, for example a low thermal conductivity material for the arms and a high thermal conductivity or highly absorptive material for the absorber.

The thermal path between the signal sections 28a and the substrate 55 flows through the narrow suspension arms 56, to the reference sections 28b, down the bumps 58, and thence to the substrate 55. Optionally (not illustrated), in place of the bumps 58 a pattern of holes can be etched through the reference section 28b to allow the suspension arms 56 to terminate directly on the substrate 55, thereby thermally grounding the signal sections 28a without any substantial heat transfer to the reference sections 28b. In such an embodiment the reference section 28b is still held away from the substrate 55 by the bumps 58. Alternatively (also not illustrated), the suspension arms 56 may be terminated on the reference section 28b without contact to the substrate 55. In this embodiment, the entire set of reference and signal sections is suspended above the substrate 55 with the contact between substrate 55 and reference regions along the periphery of the structure, such as illustrated schematically in FIGS. 7 and 9 above.

The structure of FIG. 20 is readily fabricated with standard foundry techniques. In a preferred embodiment of this approach, as shown in FIG. 20, both the signal sections 28a and reference sections 28b are separated from the substrate 55 by a gap 60 which is substantially an integral number of half-waves in thickness. To form the gap 60, a patterned sacrificial layer is deposited on the substrate 55 prior to the deposition of the optical structure 10. The thickness of this layer is preferably that which provides half-wave at the readout wavelength after removal of the layer, so that the extra round trip distance the readout beam 22 must travel is substantially one wave and therefore does not affect the readout. The sacrificial layer may be polyimide, oxide, or other such material that can be removed while keeping intact other features of the design. The bumps 58, which form the thermal path between the reference regions 28b and the substrate 55, are created by patterning the sacrificial layer with a hole pattern corresponding to the desired locations for the bumps 58. The layers of the optical structure 10 are deposited on this patterned sacrificial layer and reach the substrate 55 through the holes. The optical structure 10 is then patterned and etched to create isolation areas 32 between sensor sections 28. Note that in this embodiment the reference sections 28b and signal sections 28a are coplanar both during and after the fabrication process, except in the small vicinity of the bumps.

Figure 21:
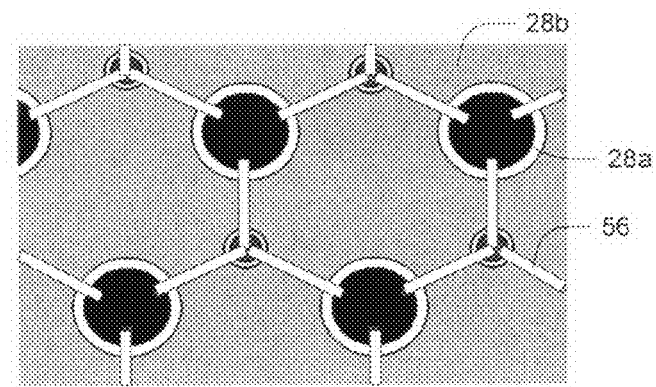
FIG. 21 is a plan view of the spatial light modulator of FIG. 20.

After deposition of the optical structure 10, a second sacrificial layer is deposited on top of the above-discussed metallic reflector layer. This second sacrificial layer is etched in an appropriate pattern to allow the suspension layer to contact both the sensor sections 28a and the reference sections 28b as described above. The suspension layer is then deposited on the sacrificial layer and patterned to form narrow suspension arms 56 and broad extended absorbers (if utilized). Finally, the sacrificial layers are etched away. The inset plan view in FIG. 21 shows schematically a hex grid layout for the signal sections 28a with three suspension arms 56 per signal section 28a, with the extended absorbers being omitted for clarity. Alternative configurations may be envisioned through other combinations of the features previously described, including, by way of example, fewer or more suspension arms, and suspensions of different shapes that achieve greater or less amounts of thermal isolation. Reference sections 28a may also be suspended from suspension arms such that alternating signal and reference sections may be achieved as shown in FIG. 10.

In another embodiment, the bumps 58 in the reference sections 28b can be replaced with high thermal conductivity posts or standoffs. The first layer of sacrificial material, patterned with the same holes as required for the bumps 58, is overcoated with a high conductivity material to form standoff posts. The surface is then planarized to create a uniform surface for the subsequent deposition of the optical structure 10. The posts, preferably, are fabricated from a high thermal conductivity material, such as alumina, to provide good thermal contact between reference sections 28b and the substrate 55, or a material that is readily planarized, such as silicon nitride.

Figure 22:
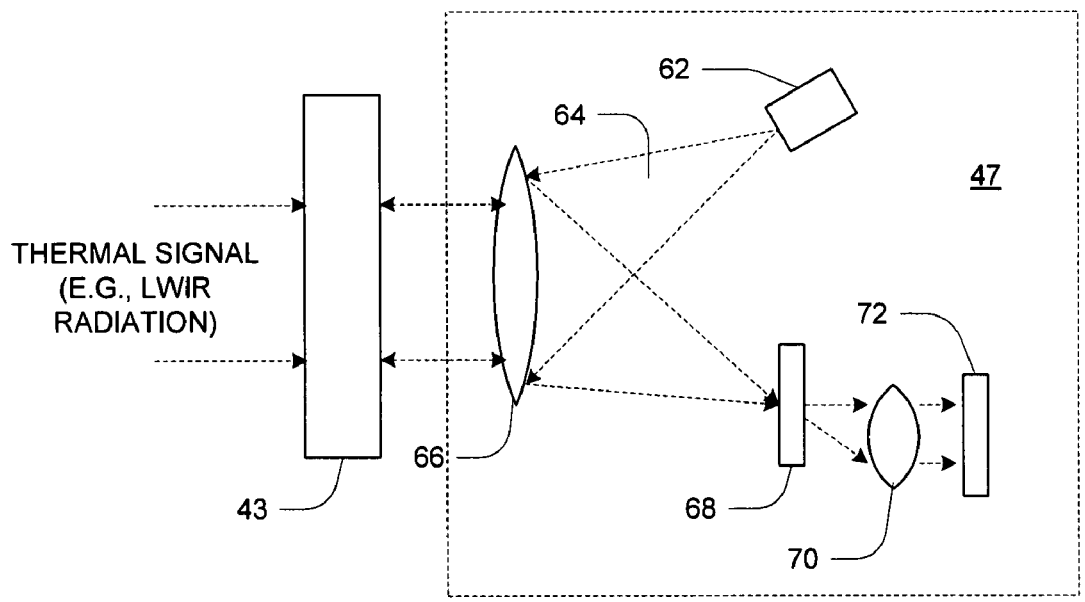
FIG. 22 is a block diagram showing the use of a particular optical structure according to an embodiment of the invention.

FIG. 22 shows an example of one type of optical structure 47 that can be utilized in conjunction with an SLM 43 such as shown in FIG. 13. The optical structure 47 includes a light source 62 (for example a NIR laser) generating a diverging beam 64. The beam 64 impinges on a lens 66 which collimates the beam 64 and directs it to the SLM 43 as the incident optical beam 22. The light reflected from the SLM 43 (which is the outgoing beam 26) is converged by the lens 66. In the focal plane is placed a filter 68, whose structure and operation are described below. Beyond the focal plane (where the light is diverging), an additional lens 70 is placed to collimate the light and direct it to a transducer subsystem 72 for example. Transducer subsystem 72 may be a CMOS or CCD transducer, or other such transducer that generates an electronic signal in response to an optical input.

Figure 23A:
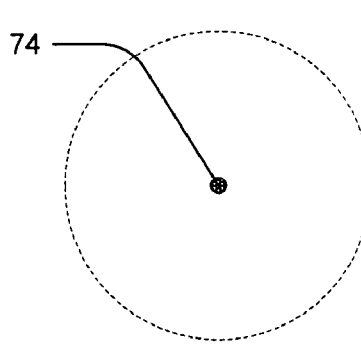
FIGS. 23(a) and 23(b) are schematic representations of components of a composite image in the system of FIG. 22.

FIG. 23 illustrates patterns of light that appear in the focal plane of the lens 66. FIG. 23(a) illustrates the pattern that appears when there is no signal 49 (FIG. 13) present, such that only the common-mode component of the signal outgoing beam 26 is present. In this case, the thin-film structure of the SLM 43 functions substantially as a plane mirror, with the signal sections S and reference sections R responding only in their common-mode fashion. Light from the SLM 43 is focused to a single common-mode focal image 74. It will be appreciated that the common-mode focal image 74 is of relatively high intensity, capturing as it does the "baseline" thermo-optic response of the signal and reference elements (described in more detail below).

Figure 23B:
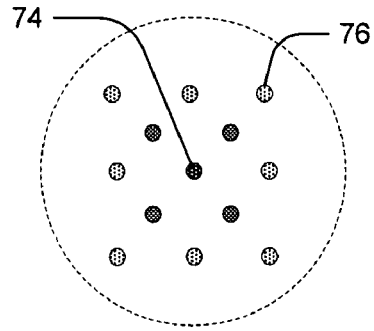

FIG. 23(b) illustrates a set of patterns that appear when there is a non-zero signal 49 present. In this situation, the signal sections S of the SLM 43 have a different reflectivity than do the reference sections R, and this difference gives rise to diffraction effects in the outgoing beam 26 reflected from the SLM 43. There is still the common-mode focal image or component 74, and also several differential-mode images or components 76 which are spaced apart by an amount corresponding to the spacing of the signal sections S of the SLM 43. The pattern in FIG. 23(b) can be viewed as a spatial Fourier transform of the outgoing beam 26 generated by the SLM 43. It should be noted that the pattern shown in FIG. 23(b) results from a checkerboard-like arrangement of signal sections S and reference sections R, which is different from the arrangements shown in FIGS. 10 and 21 above. Those skilled in the art will appreciate that the arrangements of FIGS. 10 and 21 cause correspondingly different patterns of components 76.

Figure 24:
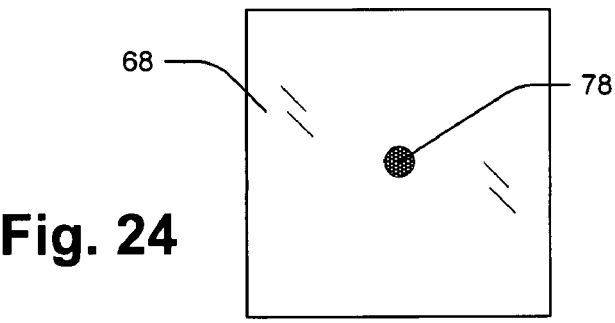
FIG. 24 is a diagram of a spatial Fourier filter utilized in the system of FIG. 23.

FIG. 24 shows the filter 68. It is sheet of material that is generally transparent at the wavelength of the light source 62, with a central opaque area 78 that serves to block the common-mode component 74 while permitting the differential-mode components 76 to pass. Other types of spatial patterns may be also be used this filtering, such as a filter that passes on a single first diffraction order. A single first order passing filter may be advantageous in reducing unwanted signals from features in the array at different spatial frequencies.

While this invention has been particularly shown and described with references to preferred embodiments thereof, it will be understood by those skilled in the art that various changes in form and details may be made therein without departing from the spirit and scope of the invention as defined by the appended claims.

For example, another potential application for the SLM is as part of a display (such as a visual display) for displaying information expressed in a display control signal. Referring again to FIG. 13, in this application the received signal 49 is the display control signal, which may be for example a set of electrical signals that collectively express or convey the display information (i.e., the intensities and/or colors to be displayed at various locations of a two-dimensional display, for example). The thermal structure 45 is configured to convert the received signal 49 into a spatially varying pattern of thermal energy provided to the SLM 43. In one embodiment, the thermal structure 45 of such a display includes a spatially arranged set of heating elements, such as resistors, which are "addressed" or controlled by the received signal 49 in a manner that impresses the image to be displayed onto the SLM 43 in the form of the spatially varying pattern of thermal energy 51. The optical structure 47 contains optical readout components collectively configured to generate the incident optical beam 22 and to process the outgoing optical beam 26 with an appropriate set of optics to project this beam onto a display screen. If the above-described approach of using signal and reference sections 28a, 28b is used, then the optical structure 47 might include a Fourier filter and lenses to project the filtered beam onto the display screen. Another method is to use the thermal energy to create a phase image of the Fourier transform of the image that is to be projected, and then the light can be displayed directly with no intervening optics (except perhaps for scaling) because the far-field pattern will be the Fourier transform of the phase pattern on the array.

What is claimed is:

1. Apparatus comprising a thin-film interference filter structure having a generally wavelength-dependent phase response to incident optical energy in a predetermined range of wavelengths,
 the thin-film interference filter structure including at least one thermally tunable layer such that a range of wavelength-dependent phase responses are induced by a corresponding range of thermal conditions of the thermally tunable layer,
 the thin-film interference filter structure being configured to (1) receive a spatially varying pattern of thermal energy at the thermally tunable layer, and (2) receive the incident optical energy into the thermally tunable layer and impart upon output optical energy spatial phase modulation corresponding to the spatially varying pattern of thermal energy.

2. An apparatus according to claim 1 configured to operate in reflection such that the output optical energy propagates in a direction substantially opposite the direction of propagation of the incident optical energy.

3. An apparatus according to claim 1 wherein the thermally tunable layer is a thermo-optic material and the thermally tunable optical characteristic comprises a temperature-dependent index of refraction n satisfying the relationship $|(1/n)(dn/dT)|>10^{-5}/K$.

4. An apparatus according to claim 1 further comprising thermal isolation areas to create patterned thermally tunable layers.

5. An apparatus according to claim 4 wherein the thin film interference filter comprises a mirror in thermal contact with the thermally tunable layer, the mirror being continuous across the patterned thermally tunable layers.

6. An apparatus according to claim 4 further comprising a mask preventing substantially all of the incident optical energy from being incident on the thermal isolation areas.

7. An apparatus according to claim 6 further comprising a mirror wherein the optical path difference between the mask and the mirror is nominally a half wavelength of the incident optical energy.

8. An apparatus according to claim 4 wherein the thermal isolation areas are patterned to impart a spatial phase modulation to the output optical energy separable from the spatial phase modulation corresponding to the spatially varying pattern of thermal energy.

9. An apparatus according to claim 8 wherein spatial modulation to the output optical energy due to the thermal isolation areas is at a higher frequency than the spatial modulation due to the thermal energy.

10. An apparatus according to claim 1 wherein the thin-film interference structure further includes a thermal ground structure providing a thermal ground for the thermally tunable layer.

11. An apparatus according to claim 10 wherein the temperature of the thermal ground structure is controlled to select the optical wavelength of the wavelength-dependent phase response.

12. An apparatus according to claim 10 wherein the temperature of the thermal ground structure is measured and used to set the optical wavelength of the incident optical energy.

13. An apparatus according to claim 1 wherein the thermally tunable layer is thermally isolated from any thermal ground structure in the apparatus.

14. An apparatus according to claim 1 further configured to receive a second spatially varying pattern of thermal energy at the thermally tunable layer.

15. An apparatus according to claim 1 wherein the thermally tunable layer is configured for self-referencing by inclusion of signal sections and reference sections, the signal and reference sections sharing a common-mode response to background thermal energy and having a differential response to the received pattern of thermal energy.

16. An apparatus according to claim 15 wherein the signal sections include thermal absorbers configured to increase the differential response between the signal sections and the reference sections to the received pattern of thermal energy.

17. An apparatus according to claim 15 wherein adjacent signal sections and reference sections are thermally isolated from each other to enhance resolution and signal-to-noise performance of the apparatus.

18. An apparatus according to claim 15 further comprising a mask configured to reduce the amount of the incident optical energy reaching areas of the thermally tunable layer between adjacent isolated regions.

19. An apparatus according to claim 15 further configured to include a predetermined bias in the differential response of the signal and reference sections to improve linearity and to enable sensing of thermal conditions colder than background thermal conditions.

20. An apparatus according to claim 19 wherein the predetermined bias of the signal sections is effected by thin film optical layer means.

21. An apparatus according to claim 19 wherein the predetermined bias of the signal sections is effected by thermal means.

22. An apparatus according to claim 19 wherein the predetermined bias is effected through mechanical means.

23. An apparatus according to claim 19 wherein the predetermined bias is limited to substantially the same optical wavelengths as the generally wavelength-dependent phase response.

24. An apparatus according to claim 15 wherein the signal and reference sections are thermally isolated from a thermal ground plane using substantially the same thermal isolation means.

25. The apparatus according to claim 1 wherein the thin film interference structure is a Gires-Tournois etalon.

26. An instrument for measuring or sensing a pattern of source thermal energy generated by a source external to the instrument, comprising:
 the apparatus of claim 1;
 a thermal transfer structure configured to convert the pattern of source thermal energy into the spatially varying pattern of thermal energy received by the thermally tunable layer of the apparatus of claim 1; and optical readout components collectively configured to generate the incident optical energy provided to the thermally tunable layer and to utilize the output optical energy to provide information to a user of the instrument about the spatial distribution of the pattern of source thermal energy.

27. An instrument according to claim 26 wherein the thermal transfer structure is configured to receive the pattern of source thermal energy in the form of radiated thermal energy.

28. An instrument according to claim 26 wherein the thermal transfer structure is configured to receive the pattern of source thermal energy in the form of conducted thermal energy.

29. An instrument according to claim 28 wherein the conducted thermal energy is generated by chemical or biological means.

30. A display for displaying information expressed in a display control signal, comprising:
    the apparatus of claim 1;
    a thermal structure configured to convert the display control signal into the spatially varying pattern of thermal energy received by the thermally tunable layer of the apparatus of claim 1; and
    optical readout components collectively configured to generate the incident optical energy provided to the thermally tunable layer and to provide the output optical energy to a set of spatially arranged display elements configured to convert respective portions of the output optical energy into respective picture elements of a display.

31. A display according to claim 30 wherein the thermal structure comprises a spatially arranged plurality of heating elements.

32. A display according to claim 31 wherein the heating elements are electrically addressable.

33. An optical device for use in an optical communications system, comprising:
    the apparatus of claim 1;
    an optical structure configured to (1) provide a first optical communications signal to the apparatus of claim 1 as the incident optical energy, and (2) utilize the output optical energy from the apparatus of claim 1 as a second optical communications signal; and
    a thermal structure configured to generate, in response to a control signal generated when a desired optical function is to be performed, the spatially varying pattern of thermal energy received by the thermally tunable layer of the apparatus of claim 1, wherein the spatially varying pattern of thermal energy is a predetermined pattern effective to enable the apparatus of claim 1 to perform the desired optical function.

34. An optical device according to claim 33 wherein the first and second optical communications signals are wavelength-division-multiplexed (WDM) optical communications signals, and wherein the desired optical function includes the selective add/drop of one or more wavelengths to/from other wavelengths of the first WDM optical communications signal.

* * * * *